United States Patent [19]
Meier

[11] 3,788,134
[45] Jan. 29, 1974

[54] TEMPERATURE COMPENSATED MEASURING APPARATUS

[75] Inventor: Eugen Meier, Meilen, Switzerland

[73] Assignee: Mettler Instrumente, AG, Zurich, Switzerland

[22] Filed: Nov. 10, 1972

[21] Appl. No.: 305,173

[30] Foreign Application Priority Data
Nov. 23, 1971 Switzerland.................. 17022/71

[52] U.S. Cl. .......... 73/141 AB, 73/DIG. 1, 177/226
[51] Int. Cl. ............................ G01l 1/04, G01l 1/10
[58] Field of Search.. 73/141 AB, DIG. 1, 282, 283, 73/393, 497; 177/201, 210, 225, 226, 228, DIG. 5; 335/217

[56] References Cited
UNITED STATES PATENTS

| | | | |
|---|---|---|---|
| 3,683,697 | 8/1972 | Thebis | 73/497 X |
| 3,185,232 | 5/1965 | Iwasaki | 177/225 |
| 3,692,128 | 9/1972 | Gallo | 177/210 |
| 3,712,395 | 1/1973 | Streater et al. | 177/210 |

*Primary Examiner*—Charles A. Ruehl
*Attorney, Agent, or Firm*—Lawrence E. Laubscher

[57] ABSTRACT

Force or length measuring apparatus including a movable member—such as a pan carrier—movably connected with a housing, and a measuring member—such as an oscillating string element or a traction spring—connected between said housing and said movable member for measuring the movement of said movable member, characterized by the provision of temperature compensation means including at least one pair of cooperating permanent magnets for applying to at least one of said movable and measuring members a biasing force of a magnitude and direction to compensate for temperature-responsive variations in a physical property of the measuring member, thereby to reduce the influence of variations in temperature on the resulting measurement.

5 Claims, 3 Drawing Figures

TEMPERATURE COMPENSATED MEASURING APPARATUS

This invention relates to force or length measuring apparatus, such as a force-measuring apparatus including at least one pre-tensioned string, or at least one traction spring.

Apparatus for measuring a force or a length has been proposed, comprising a movable portion which can be deflected out of an initial position, and a measuring member which is responsive to such deflection.

In apparatus of this kind, influences arising out of fluctuations in temperature frequently have an undesired effect, and particularly in the case of precision measuring apparatus, such influences can be the cause of substantial inaccuracy in measurement.

The parameters which can be considerably influenced by fluctuations in temperature include the zero point and the sensitivity of the apparatus, that is to say, the variation in the measured value in relation to the variation in the magnitude to be measured.

According to a primary object of the present invention, there is provided a force or length measuring apparatus comprising a movable portion which can be deflected from an initial position, a measuring member which is responsive to such deflection, and at least one magnet system operative to cause a force to be applied to the movable portion and/or the measuring member to reduce the influence of temperature fluctuations on the resultant measurement.

Other objects and advantages of the invention will become apparent from a study of the following specification, when viewed in the light of the accompanying drawing, in which.

Figure 1:
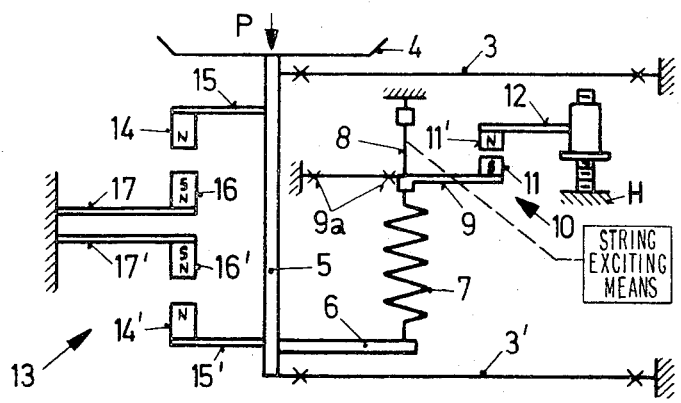
FIG. 1 is a diagrammatic illustration of a first embodiment of the invention wherein the measuring member is a tensioned oscillatory string.

Referring to FIG. 1, the force-measuring apparatus is in the form of a string balance comprising a parallel guide system formed by guide levers 3 and 3' connected at one end with the housing H, a balance pan 4 and a carrier 5 therefor. The pan 4 and carrier 5 are so disposed that they are vertically movable under the influence of a load P. A cantilever arm 6 on the carrier 5 is connected with one end of a traction spring 7, while connected with the other end of the traction spring 7 is one end of a measuring member in the form of a measuring string 8 the other end of which is secured to a fixed part of the balance. The measuring string 8 is provided with conventional oscillating drive means (not shown) which operate in known manner to excite it to a state of transverse oscillation, the frequency of oscillation varying according to the load P on the pan 4 and carrier 5. The variation in frequency forms a measurement of the magnitude of the load P, and is evaluated or indicated by conventional electronic means (not shown).

Secured to the point of connection between the traction spring 7 and the measuring string 8 is a cantilever arm 9, which is connected by way of resilient links 9a to the balance housing. The arm 9 carries a first magnet 11 of a magnet system 10. Cooperating with the magnet 11 is the second magnet 11' of the magnet system, the magnet 11' being carried on a holder 12 mounted on the fixed part of the balance and the unlike poles of the two magnets being adjacent each other.

In operation, the adjacent unlike poles of magnets 11, 11' apply an attraction force to each other, and since the magnet 11' is fixed, the effect of the force is to reduce the initial tension in the string 8. If the ambient temperature rises, the string 8 increases in length in accordance with its coefficient of linear expansion, and its bending stiffness also decreases. Both phenomena have an additive effect in reducing the oscillation frequency of the string 8. Owing to the increase in temperature however, the attraction force between the two magnets 11 and 11' also decreases, so that the initial tension in the string 8 correspondingly increases due to the reduced action of the magnet system. With suitable dimensioning, it is therefore possible for the reduction in oscillation frequency which occurs in the string 8 with increasing temperature to be compensated for by an increasing tension in the string (the same will of course apply, but in reverse, for a reduction in temperature).

This arrangement therefore makes it possible for expansion of the string and the variation in bending stiffness to be corrected so that it has virtually no longer any effect on the zero point, which in this case corresponds to the frequency of oscillation of the measuring string only under the initial tension (that is, without any load to be measured acting on the string).

In order to keep the dimension of the magnets small, the magnets used will desirably have a high temperature coefficient, and will comprise, for example, ferrite.

To permit adjustment of the magnet arrangement 10, the holder 12 is preferably connected for vertical displacement relative to the housing H.

The balance of FIG. 1 also has a second magnet system 13 arranged as follows: each of two magnets 14 and 14' is connected by way of a cantilever arm 15 and 15', respectively, to the carrier 5 of the pan 4. Arranged in the space between the magnet 14 and 14' are two further magnets 16 and 16' which are mounted by means of holders 17 and 17' on the fixed part of the balance, which holders may also be vertically displaceable by conventional adjustment means, not shown, for adjustment purposes. The two magnets 14' and 16' are arranged with their like poles adjacent, while the two magnets 14 and 16 have their unlike poles adjacent.

As described in the Meier U. S. application Ser. No. 252,458 filed May 11, 1972, linearization magnet arrangements are well suited to achieving linearization of the frequency-load function of a measuring string. An accompanying phenomenon which should be taken into account in this respect, however, is temperature dependence of the magnet force, which represents a source of error which, under certain circumstances, can have an influence even when using magnets with a low temperature coefficient. This source of error can be countered by the magnet arrangement 13. With this arrangement, besides the linearization effect, it is also possible to provide compensation for the effect of temperature fluctuations on the magnetic forces, in that, when such fluctuations occur, both the attraction force between the magnets 14 and 16 and the repelling force between the magnets 14' and 16' vary approximately uniformly over the range of deflection movement. This means that any variation in the sensitivity of the arrangement, owing to temperature-dependent performance of the linearization magnets, is virtually eliminated.

It would also be possible, in order to compensate for the temperature coefficient of the magnets, to use arrangements in which one or more of the magnets is provided with a coil through which flows a current, the magnitude of which varies in dependence on temperature. Such a construction is less desirable, however, because of its increased cost in comparison with a construction similar to that illustrated in FIG. 1.

Another source of error comprises the variable sensitivity of the string when subject to fluctuations in temperature. This can be countered in a simple manner, by adjusting the distance between the magnets 14, 16 and 14', 16', respectively, to be unequal. This can provide an intentional variation in the sensitivity of the magnet arrangement with varying temperature, in order precisely to compensate for the variation of the sensitivity of the string within the range of deflection movement of the movable portion of the measuring apparatus.

Figure 2:
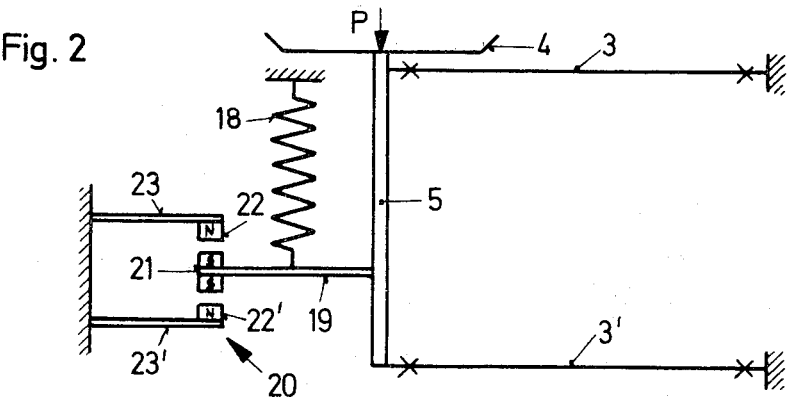
FIG. 2 is a diagrammatic view of a second embodiment wherein the measuring element is a tension spring.

FIG. 2 shows a spring balance which is of substantially the same construction as the string balance shown in FIG. 1. Accordingly, the same references (3 to 5) are used for the basic structure. The measurement function is performed in known manner in this construction by a traction spring 18 which is secured at one end to a fixed part of the balance and at the other end, by way of a cantilever arm 19, to the carrier 5 of the pan 4. A magnet system 20 comprises a magnet 21 which is also secured to the arm 19, and two magnets 22 and 22' which are operatively associated with the magnet 21 so that unlike poles are adjacent each other. The magnets 22 and 22' are carried on holders 23 and 23' which in turn are mounted on the fixed part of the balance and are again preferably vertically displaceable.

With this arrangement—which represents a "magnetic spring" which is linear in a first approximation, with a negative spring constant—it is again possible substantially to correct influences on balance sensitivity, resulting from temperature-dependent variations in the constants of the measuring spring.

Figure 3:
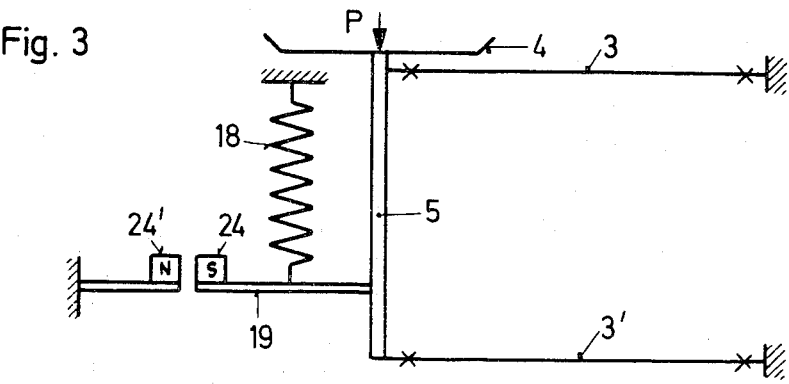
FIG. 3 illustrates diagrammatically a modification of the apparatus of FIG. 2.

FIG. 3 shows another construction for achieving the above described compensation effect, which arrangement is equivalent in function but which is simpler in construction. This arrangement comprises a magnet system formed by a pair of magnets 24 and 24' arranged with their poles adjacent each other and with a vertical air gap between them. The correction forces are formed by the magnetic force components which occur when the pan carrier 5 is deflected from the zero position shown and which are inclined to the horizontal.

In the string balance embodiment of FIG. 1, there is a substantial compensation for variations in the zero point as a function of deviation in temperature. It should be noted in this connection that the same arrangement is generally suitable for use in any system in which the measuring member (i.e., the string in FIG. 1) operates virtually without movement, that is to say, also for example for apparatus with electromagnetic force compensation.

The invention was described hereinbefore with reference to apparatus in which a force is determined by way of a movement. It is obvious that similar considerations also apply in principle to the reverse case, namely if a distance or a length is to be measured by means of a variation in a force.

What is claimed is:

1. A measuring apparatus, comprising
   a. a housing (H):
   b. a pan carrier member (5) connected for rectilinear movement relative to said housing, said pan carrier member being displaceable upon the application of load thereto from an initial no-load position toward a loaded position;
   c. a string member (8) connected under tension between said housing and said pan carrier member, said string member having a physical property that varies as a function both of the displacement of said pan carrier member from said initial position and of variations in temperature;
   d. means for exciting said string member to a condition of oscillation, whereby the frequency of oscillation of said string member is a function of the magnitude of the load applied to said pan carrier member; and
   e. temperature compensating means including at least one temperature-responsive permanent magnet system for applying to at least one of said pan carrier and string members a biasing force of a direction and magnitude to compensate for variations in said physical property as a function of temperature.

2. Apparatus as defined in claim 1, wherein said magnet system includes a first pair of cooperating permanent magnets (11, 11') of opposite polarity connected with said housing and with said string member, respectively, said magnets being arranged to effect a reduction in the initial tension in said string member, said magnets having such a force of attraction relative to the temperature coefficient of said string member that temperature-responsive variations in the length of bending stiffness of said string member are compensated for by the temperature-responsive variation in the strength of said magnetic force of attraction, whereby the frequency of oscillation of said string member is independent of variations in temperature.

3. Apparatus as defined in claim 2, wherein said temperature compensation magnet means comprises a second pair of cooperating permanent magnets (14, 16) of opposite polarity connected with said pan carrier and with said housing, respectively, for applying to said pan carrier a biasing force in one direction, and a third pair of permanent magnets (14', 16') of like polarity connected with said pan carrier and with said housing, respectively, for applying to said pan carrier a biasing force in the same direction.

4. A measuring apparatus, comprising
   a. a housing;
   b. a pan carrier (5) connected for rectilinear movement relative to said housing, said pan carrier being displaceable upon the application of a load thereto from a no-load position toward a loaded position;
   c. a traction spring (18) connected between said housing and said pan carrier to resist movement of said pan carrier from said no-load position, said traction spring having a physical property that varies as a function both of the displacement of said pan carrier from said initial no-load position and of variations in temperature; and
   d. temperature compensating means including at least one temperature-responsive permanent magnet system for applying to said traction spring a biasing force of a direction and magnitude to compensate for variations in said physical property as a function of temperature, said magnet system including a first pair of cooperating permanent magnets (21, 22) of opposite polarity connected with said pan carrier and with said housing, respectively, for applying to said pan carrier a biasing force in one direction, and a second pair of cooperating permanent magnets (21', 22') connected with said pan carrier and with said housing, respectively, for applying to said pan carrier a biasing force in the opposite direction, the magnitude of said biasing forces being such relative to the spring constant of said traction spring as to correct for adverse influences on balance sensitivity that result from temperature-responsive variations in said spring constant.

5. A measuring apparatus, comprising
   a. a housing;
   b. a pan carrier connected for rectilinear movement relative to said housing, said pan carrier being displaceable upon the application of a load thereto from a no-load position toward a loaded position;
   c. a traction spring connected between said housing and said pan carrier to resist movement of said pan carrier from said no-load position in the direction of said loaded position, said traction spring having a physical property that varies as a function both of the displacement of said pan carrier from said initial no-load position and of variations in temperature; and
   d. temperature compensating means including at least one temperature-responsive permanent magnet system for applying to said traction spring a biasing force of a direction and magnitude to compensate for variations in said physical property as a function of temperature, said magnet system including a pair of cooperating permanent magnets (24, 24') connected with said housing and with said pan carrier, respectively, said magnets being arranged in horizontally spaced relation when said pan carrier is in the no-load position, said magnets having a mutual force of attraction that is so related to the spring constant of said traction spring as to correct for adverse influences on balance sensitivity that result from temperature-responsive variations in said spring constant.

* * * * *